United States Patent
Wilhelm (10) Patent No.: US 10,882,553 B2
(45) Date of Patent: Jan. 5, 2021

(54) KINGPIN ASSEMBLY WITH A TORQUE RECEIVING CONFIGURATION

(71) Applicant: Schaublin SA, Delémont (CH)

(72) Inventor: Chris Wilhelm, Courtavon (FR)

(73) Assignee: SCHAUBLIN SA, Delémont (CH)

( * ) Notice: Subject to any disclaimer, the term of this patent is extended or adjusted under 35 U.S.C. 154(b) by 155 days.

(21) Appl. No.: 16/118,748

(22) Filed: Aug. 31, 2018

(65) Prior Publication Data

US 2019/0071121 A1 Mar. 7, 2019

Related U.S. Application Data

(60) Provisional application No. 62/553,554, filed on Sep. 1, 2017.

(51) Int. Cl.
| | | |
|---|---|---|
| *B62D 7/18* | (2006.01) | |
| *F16C 11/06* | (2006.01) | |
| *B60G 7/00* | (2006.01) | |

(52) U.S. Cl.
CPC ............... *B62D 7/18* (2013.01); *B60G 7/005* (2013.01); *B60G 7/008* (2013.01); *F16C 11/0623* (2013.01); *F16C 11/0695* (2013.01); *B60G 2204/148* (2013.01); *B60G 2204/416* (2013.01); *B60G 2206/8207* (2013.01); *B60G 2206/92* (2013.01); *F16C 2226/60* (2013.01)

(58) Field of Classification Search
CPC .......... B62D 7/18; B60G 7/005; B60G 7/008; F16C 11/0623; F16C 11/0695
See application file for complete search history.

(56) References Cited

U.S. PATENT DOCUMENTS

| | | | | |
|---|---|---|---|---|
| 3,521,900 | A * | 7/1970 | Yasuyuki | ............... B60G 7/005 280/124.134 |
| 4,836,574 | A | 6/1989 | Ingalls | |
| 5,316,332 | A | 5/1994 | Ingalls | |
| 8,864,155 | B2 * | 10/2014 | Kuroda | .................. B60G 7/005 280/124.107 |
| 8,905,417 | B2 * | 12/2014 | Kuroda | ............... F16C 11/0657 280/124.152 |
| 10,363,786 | B1 * | 7/2019 | Parker | .................. F16C 11/0623 |
| 10,371,195 | B2 * | 8/2019 | Parker | .................. F16C 11/0652 |
| 10,544,824 | B2 * | 1/2020 | Sellers | ................... F16C 11/083 |
| 2018/0298940 | A1 * | 10/2018 | Kuroda | ............. B60G 21/0551 |
| 2019/0032702 | A1 * | 1/2019 | Kuroda | ................. F16C 11/068 |

(Continued)

FOREIGN PATENT DOCUMENTS

FR 806438 A 12/1936

OTHER PUBLICATIONS

Extended European Search Report issued in corresponding EP Application No. 18191892.1, dated Feb. 13, 2019, pp. 1-7.

*Primary Examiner* — Faye M Fleming
(74) *Attorney, Agent, or Firm* — Murtha Cullina LLP (57) ABSTRACT

A kingpin assembly includes a pin that has a shaft with a spherical member extending therefrom. The kingpin includes a base that has a spherical interior surface which defines an interior area. The interior area includes an open end of the base and is bounded by a closed end of the base. The closed end of the base is opposite the open end. The spherical member is rotatingly disposed in the interior area with the shaft extending away from the open end. The closed end has a torque receiving configuration for receiving a torque applying tool thereon.

8 Claims, 9 Drawing Sheets

(56) References Cited

U.S. PATENT DOCUMENTS

| | | | |
|---|---|---|---|
| 2019/0077208 A1* | 3/2019 | Kuroda | B60G 7/005 |
| 2019/0217679 A1* | 7/2019 | Kuroda | F16C 11/06 |
| 2020/0080590 A1* | 3/2020 | Sellers | F16C 11/0666 |

* cited by examiner

KINGPIN ASSEMBLY WITH A TORQUE RECEIVING CONFIGURATION

CROSS REFERENCE TO RELATED APPLICATIONS

This application is a non-provisional application of, and claims priority to, U.S. Provisional Application No. 62/553,554, entitled "Kingpin with a Torque Receiving Configuration", filed on Sep. 1, 2017, the entirety of which is incorporated by reference herein.

FIELD OF THE INVENTION

The present invention relates generally to a kingpin assembly with a torque receiving configuration thereon, and in particular to such a kingpin assembly that is configured for insertion into a through bore of a housing from a first end of the bore and the threading of the kingpin assembly into the housing is adjustable via access to the torque receiving configuration with a tool from a second end of the bore that is opposite the first end of the bore.

BACKGROUND OF THE INVENTION

Kingpins are generally used in automotive vehicle suspension systems to link the steering assembly, frame and wheels. Typical kingpins include a pin that has a shaft with a spherical member extending therefrom. The shaft is configured to receive a wheel. The spherical member is rotatably disposed in an interior area of a base. The base is typically threaded into a closed bore in a housing such as a linkage portion of a suspension system of the automotive vehicle.

Figure 6:
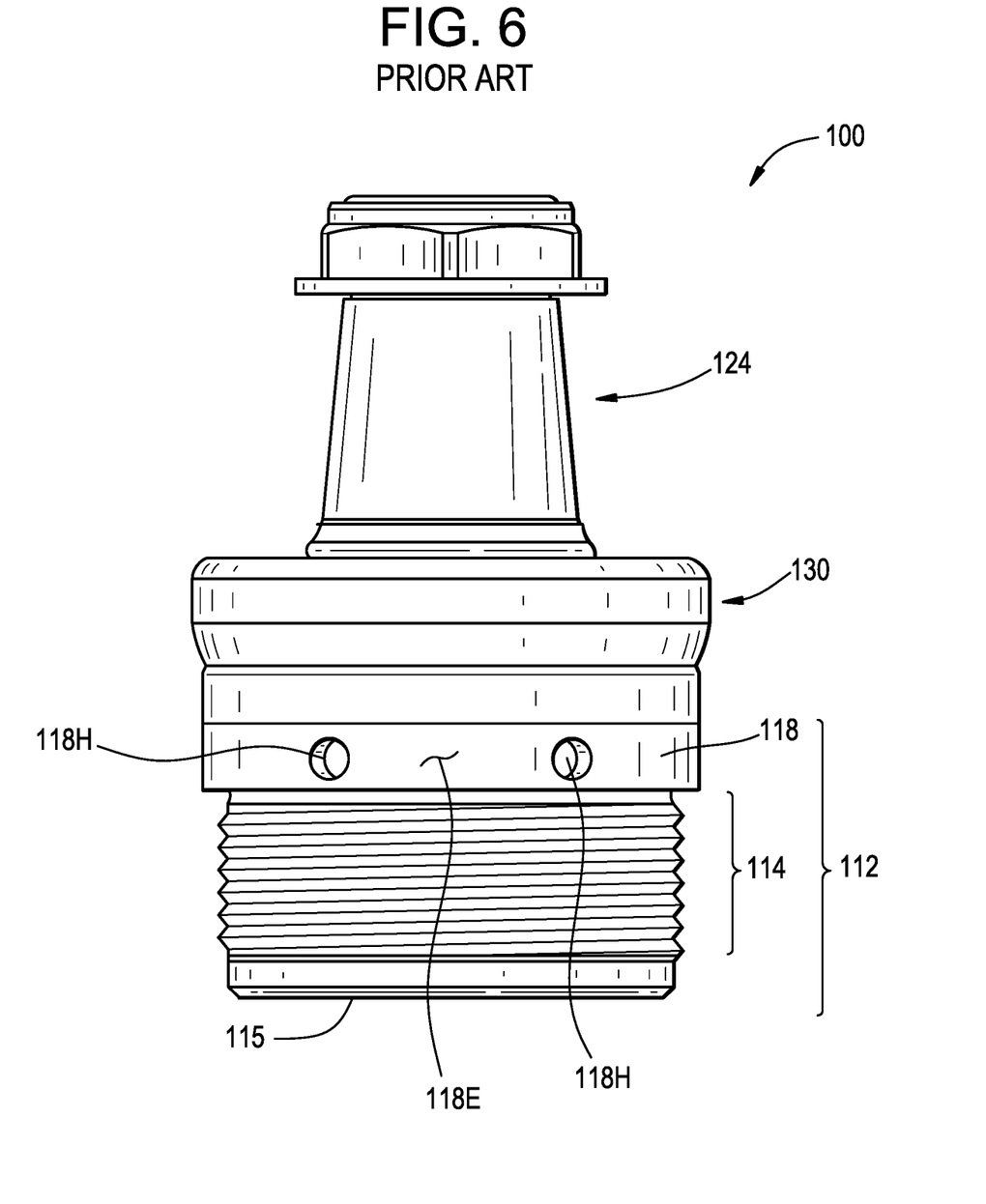
FIG. 6 is a side view of a prior art kingpin.
Figure 7:
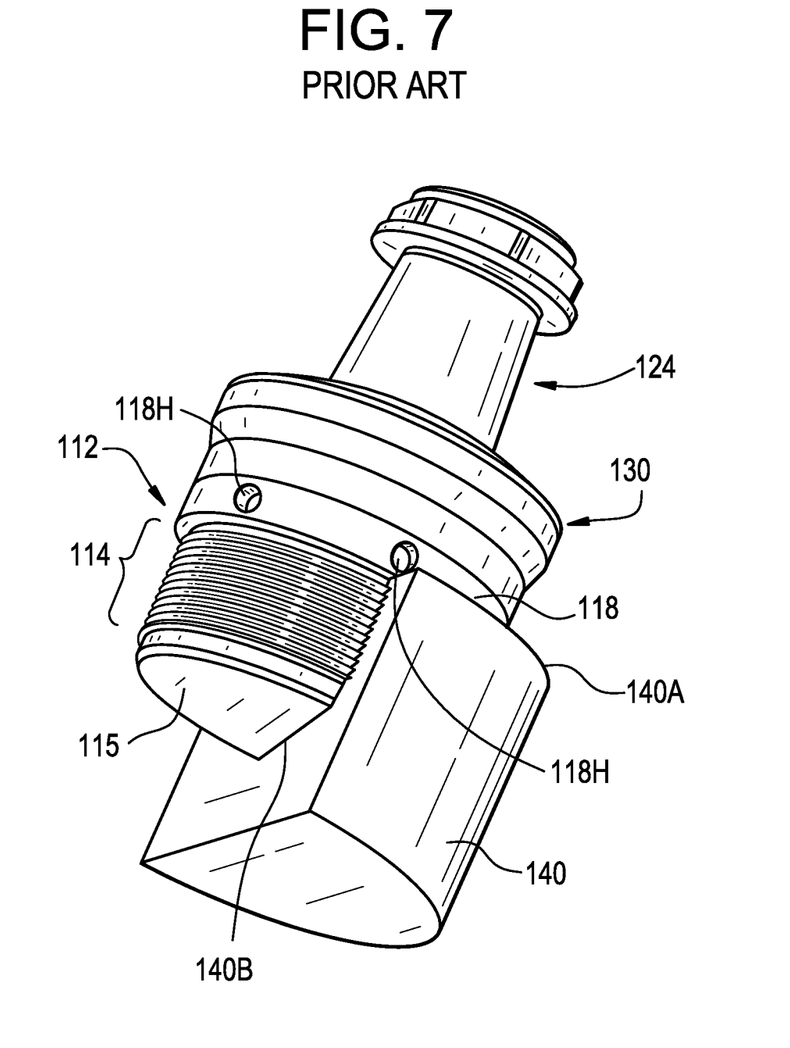
FIG. 7 is a perspective view of a prior art kingpin shown in a cutaway of a housing.
Figure 8:
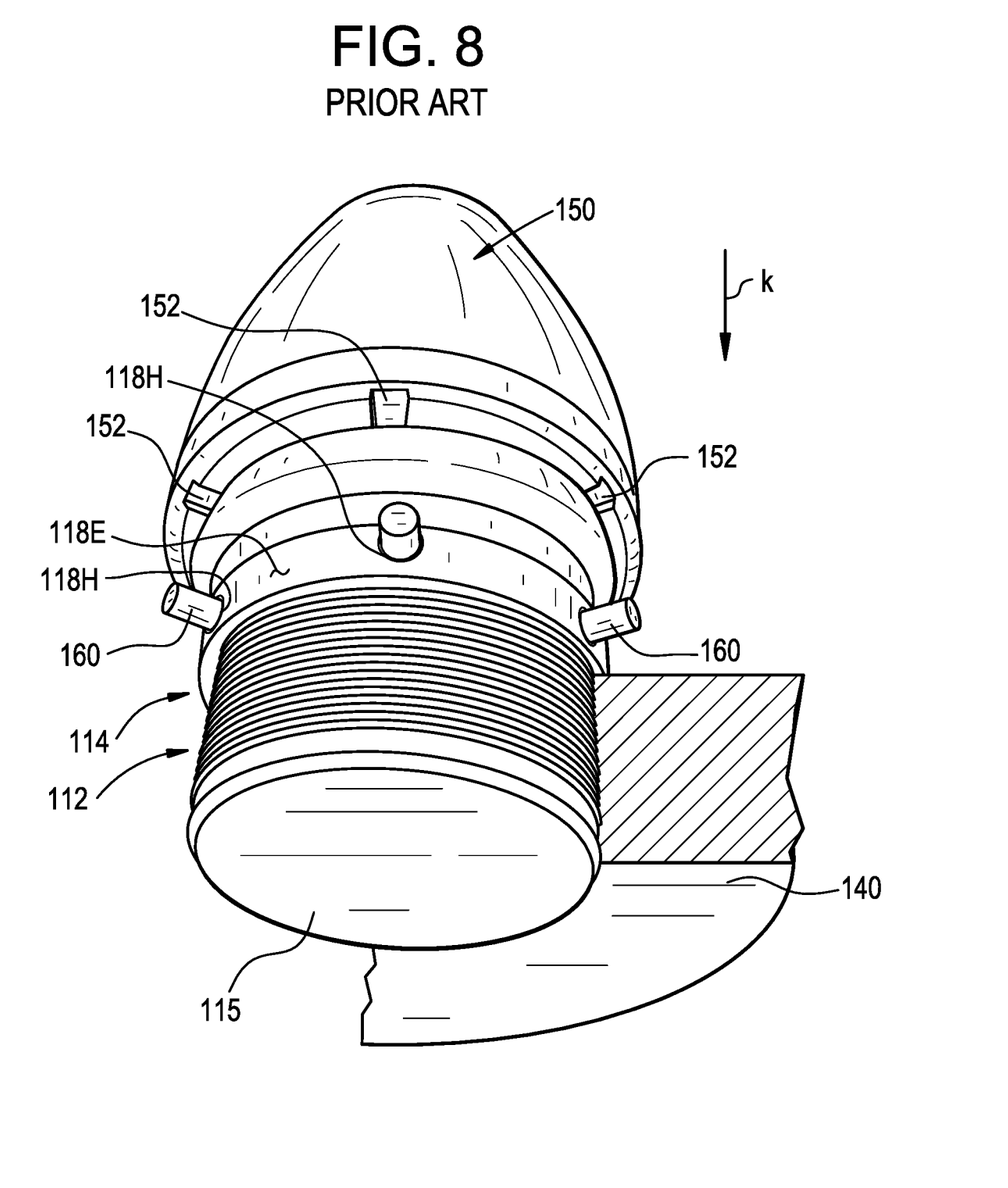
FIG. 8 is a perspective view of a prior art kingpin shown in a cutaway of the housing and with a torque application tool disposed on the kingpin.

As shown in FIGS. 6-8, a prior art kingpin is generally designated by the numeral 100. The kingpin 100 includes a pin 124 that is disposed in a base 112. The base 112 has a threaded area 114 thereon that extends from a distal end 115 of the base 112. A hub 118 is located on the base 112, between the threaded area and a seal 130. The hub 118 has a plurality of holes 118H formed therein. As shown in FIG. 7, the base is threaded into a housing 140 from an open end 140A. The base 112 has a closed end 140B that the distal end 115 of the base 112 seats on. As shown in FIG. 8, a torque application tool 150 is positioned over the pin 124. The torque application tool 150 has a plurality of slots 152 that extend around a circumferential edge of thereof. A stud 160 is disposed in each of the holes 118H. Each of the slots 152 are configured to receive a respective one of the studs 160 so that the torque application tool 150 can transfer torque to the studs 160 and to the base 112 for threading the base 112 into the housing 140.

However, the torque application tool 150 and studs 160 must be specially designed for each king pin 100. In addition, use of the torque application tool 150 and studs 160 to thread the base 112 into the housing 140 is a tedious endeavor because of space constraints. Moreover, it is difficult to achieve adequate torque by using the torque application tool 150 to thread the base 112 into the housing 140.

Based on the foregoing, there is a need for an improved king pin that overcomes the aforementioned problems.

SUMMARY OF THE INVENTION

There is disclosed herein a kingpin assembly that includes a pin which has a shaft that has a spherical member (e.g., a ball) extending therefrom. The kingpin assembly includes a base which has a spherical interior surface that defines an interior area. The interior area includes and is defined by an open end of the base. The interior area is bounded by a closed end of the base. The closed end of the base is opposite the open end. The spherical member is rotatingly disposed in the interior area with the shaft extending outwardly from the open end. The closed end has a torque receiving configuration (e.g., a nut or hex hole) for receiving a torque applying tool thereon.

In one embodiment, the base has a cylindrical exterior surface that extends continuously around the base and a portion of the cylindrical exterior surface has a threaded area thereon for removably securing the base in a housing.

In one embodiment, the torque receiving configuration is formed integrally with the base.

In one embodiment, the torque receiving configuration extends outwardly from an axial exterior surface of the closed end into the axial exterior surface of the closed end and/or radially into the closed end of the base.

There is further disclosed herein a linkage assembly that includes a housing which has a bore extending therethrough from a first axial end to a second axial end thereof. The bore has an internal threaded area. The linkage assembly includes a kingpin assembly that includes a pin that has a shaft portion with a spherical member (e.g., a ball) extending from the shaft portion. The kingpin assembly includes a base which has a spherical interior surface that defines an interior area. The interior area includes and is defined by an open end of the base. The interior area is bounded by a closed end of the base. The closed end of the base is opposite the open end. The spherical member is rotatingly disposed in the interior area with the shaft extending outwardly from the open end. The closed end has a torque receiving configuration. The shaft extends outward from the first axial end of the bore. The torque receiving configuration is proximate the second axial end of the bore, for receiving a torque applying tool thereon.

In one embodiment, the torque receiving configuration extends outwardly from the second axial end of the bore.

In one embodiment, the torque receiving configuration is disposed in the bore, proximate the second axial end of the bore.

In one embodiment, the base has a cylindrical exterior surface that extends continuously around the base. A portion of the cylindrical exterior surface has a threaded area thereon for removably securing the base to the internal threaded area in the housing.

In one embodiment, the torque receiving configuration is formed integrally with the base.

In one embodiment, the torque receiving configuration extends outwardly from an axial exterior surface of the closed end into the axial exterior surface of the closed end and/or radially into the closed end of the base.

DETAILED DESCRIPTION

As shown in FIGS. 1-5B, a kingpin assembly of the present invention is generally designated by the numeral 10. The kingpin assembly 10 includes a base 12 that has a pin 20 rotatingly seated therein, as described herein. The base 12 is generally cup shaped (e.g., U-shaped in cross section) and has a spherical interior surface 12A that defines an interior area 12B of the base 12. The interior area 12B includes an opening located at an open end 17 (e.g., a circular shaped opening that extends into the interior area 12B) of the base 12 and is bounded by a portion of the interior surface 12A that is part of and forms a closure across a closed end 19 of the base 12. The closed end 19 is opposite the open end 17. The base 12 has a generally cylindrical exterior surface 14E that extends continuously around the base 12. The base 12 has a threaded area 14 on a portion of the exterior surface 14E thereof. The threaded area 14 extends continuously and circumferentially around the base 12 and is axially aligned with apportion of the spherical member 26 shown on FIG. 4. A torque receiving configuration 16 (e.g., a nut or a stub with radially exterior surfaces forming a hexagonal configuration) extends axially outward from an axial face 15 on an axial exterior surface of the closed end 19 of the base 12. In one embodiment, the torque receiving configuration 16 is formed integrally with the base 12. The base 12 and pin 20 are manufactured from a metallic material such as a steel alloy (e.g., AISI 51200 alloy steel).

While the torque receiving configuration 16 is shown and described as being integrally formed with the base 12, the present invention is not limited in this regard as the torque receiving configuration 16 may be secured to the base 12 by welding, pinning, press fitting, and/or threading. The torque receiving configuration 16 may also extend axially into the axial face 15 (e.g., a hexagonal hole for receiving an Allen wrench or two or one or more holes for receiving pins on a torque application tool) or extend radially into the closed end 19 of the base 12 proximate the axial face 15.

Figure 5A:
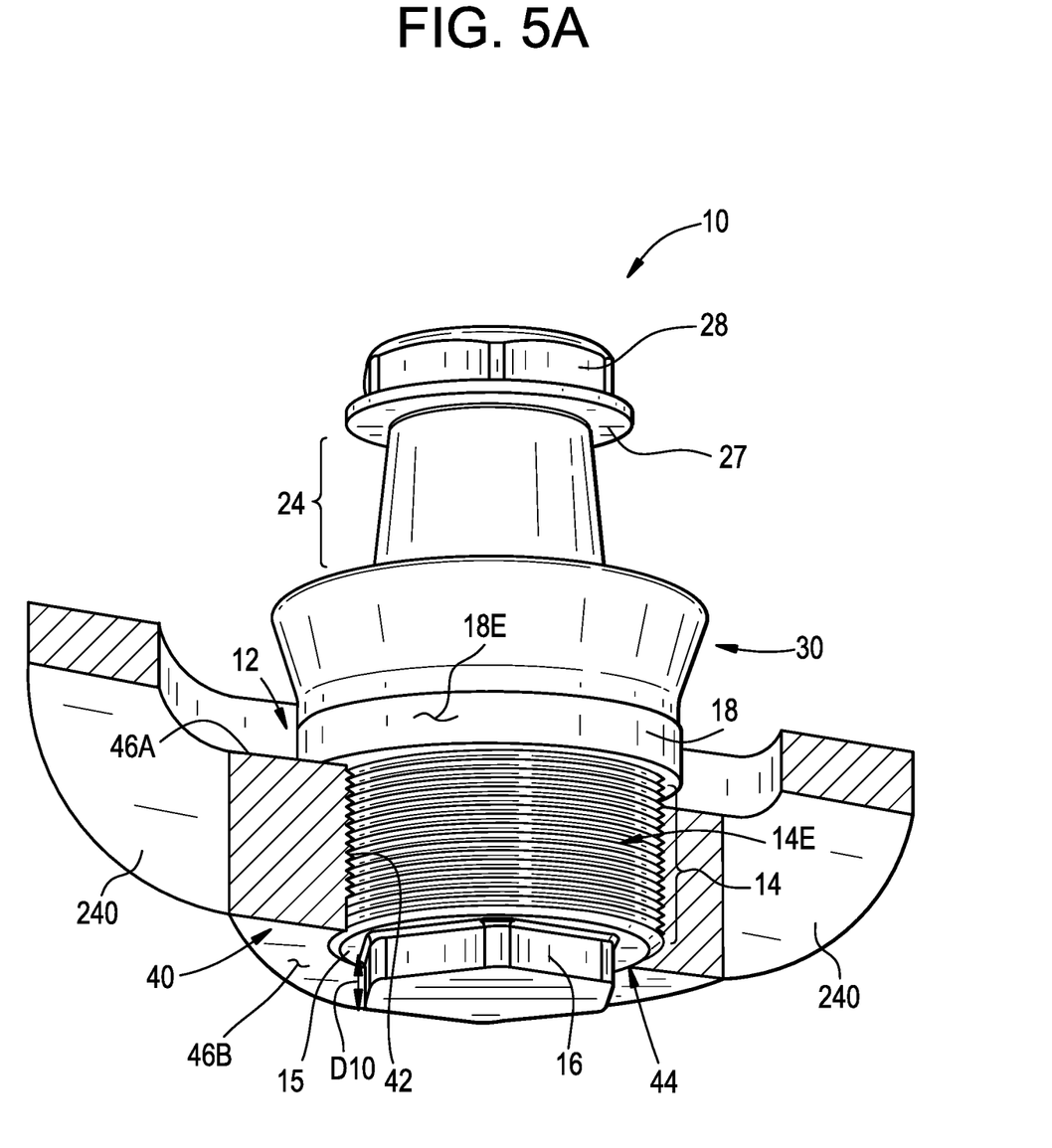
FIG. 5A is a perspective view of the kingpin assembly of FIG. 1 shown in a cutaway of a housing.
Figure 5B:
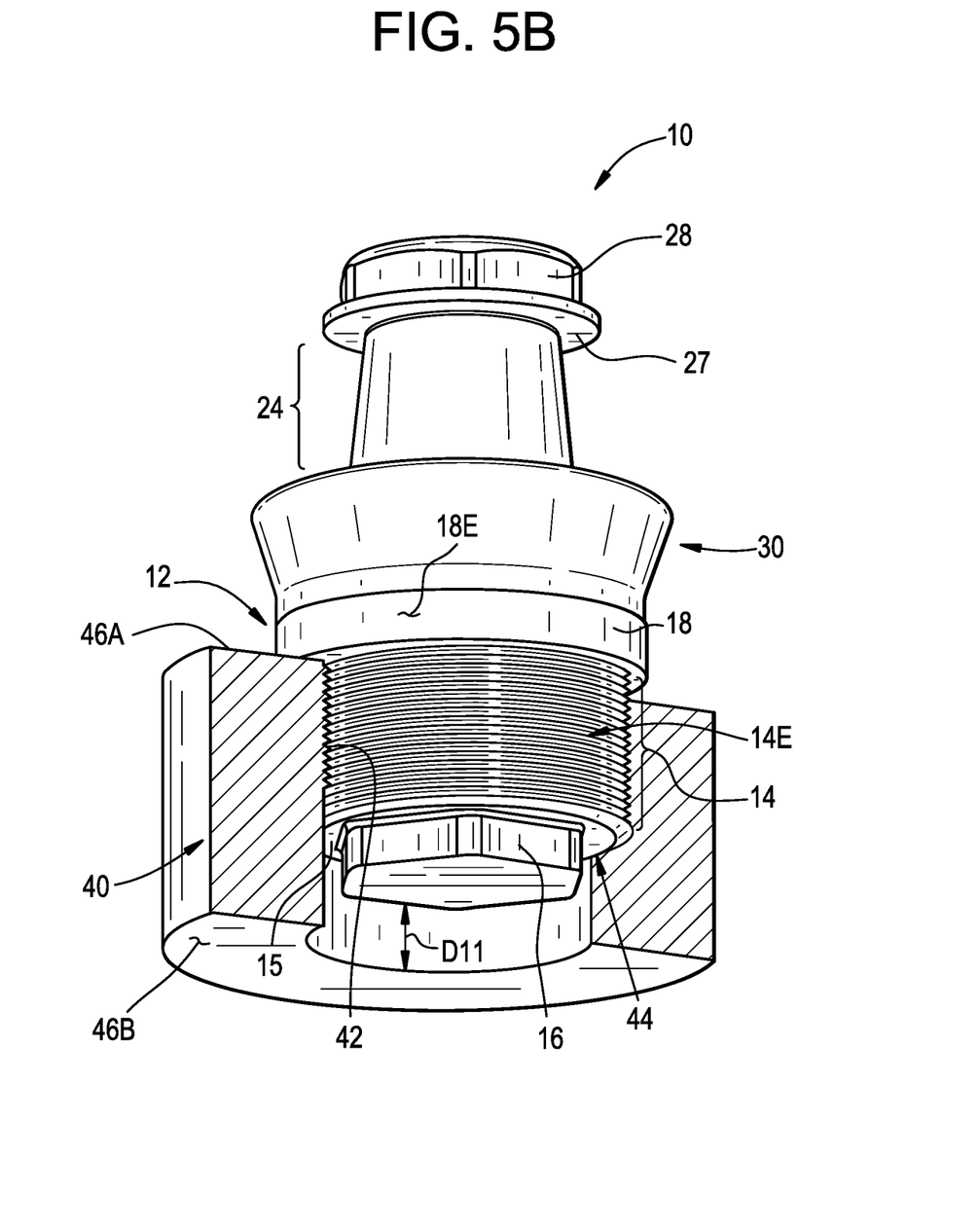
FIG. 5B is a perspective view of the kingpin assembly of FIG. 1 shown in a cutaway of a housing.

As shown in FIGS. 5A and 5B, the kingpin assembly 10 is installed in a housing 40 (only a portion of the housing 40 is shown for clarity of illustration), such as a linkage assembly 240 of a suspension system of an automobile or truck (not shown). The housing 40 has an internal threaded area 42 that defines a bore 44 that extends entirely through the housing 40 from a first axial end 46A of the housing 40 to a second axial end 46B of the housing. The threaded area 14 of the base 12 is threaded into the threaded area 42 of the bore 44. The kingpin assembly 10 extends away from the first side 46A of the housing 40 and the torque receiving configuration 16 is accessible from the second side 46B which is opposite the first side 46A, via the bore 44. In one embodiment, the torque receiving configuration 16 extends away from the second axial end 46B of the bore 44, by a distance D10, as shown in FIG. 5A. In one embodiment, the torque receiving configuration 16 is disposed in the bore 44, proximate the second axial end 46B of the bore 44 by depth D11, as shown in FIG. 5B. Since the bore 44 extends entirely through the housing 40, the torque receiving configuration 16 is proximate the second axial end 46B of the bore 44 such that the torque receiving configuration 16 is accessible for engagement with a torque transmittal tool (not shown) such as a socket, for applying torque to the base 12. Thus, no torque transmitting tool is required to apply torque to the hub 18 to install or remove the base 12 into or out of the housing 40.

As shown in FIGS. 1-5B, the base 12 includes a hub 18 extending radially outward from the base 12 proximate an open end 17 of the base 12. The hub 18 has a U-shaped lip 18L extending therefrom and circumferentially around the hub 18. The lip 18L defines a circumferentially extending groove 18G, for receiving a portion of a seal 30 therein. While the groove 18G is shown and described as being defined by the lip 18L, the present invention is not limited in this regard as the lip 18L may be eliminated and the groove 18G is formed in the hub 18.

As shown in FIGS. 1-5B, the hub 18 is located between the threaded area 14 and the open end 17 of the base 12. The hub 18 defines a smooth cylindrical exterior surface 18E that extends continuously circumferentially around the hub 18. The smooth cylindrical exterior surface 18E extends continuously, in an axial direction, between the threaded areas 14 and the open end 17 of the hub 18. Thus, the smooth cylindrical exterior surface 18E has no holes, axial slots, axial channels or other abutment surface extending therein, that could abut a tool for applying torque to the base 12. The smooth cylindrical exterior surface 18E has no flat lands thereon, such as flat lands that form a hexagonal surface. The smooth cylindrical exterior surface 18E has no projections, pins, rods, keys or other abutment surface extending therefrom, that could abut a tool for applying torque to the base 12.

Figure 1:
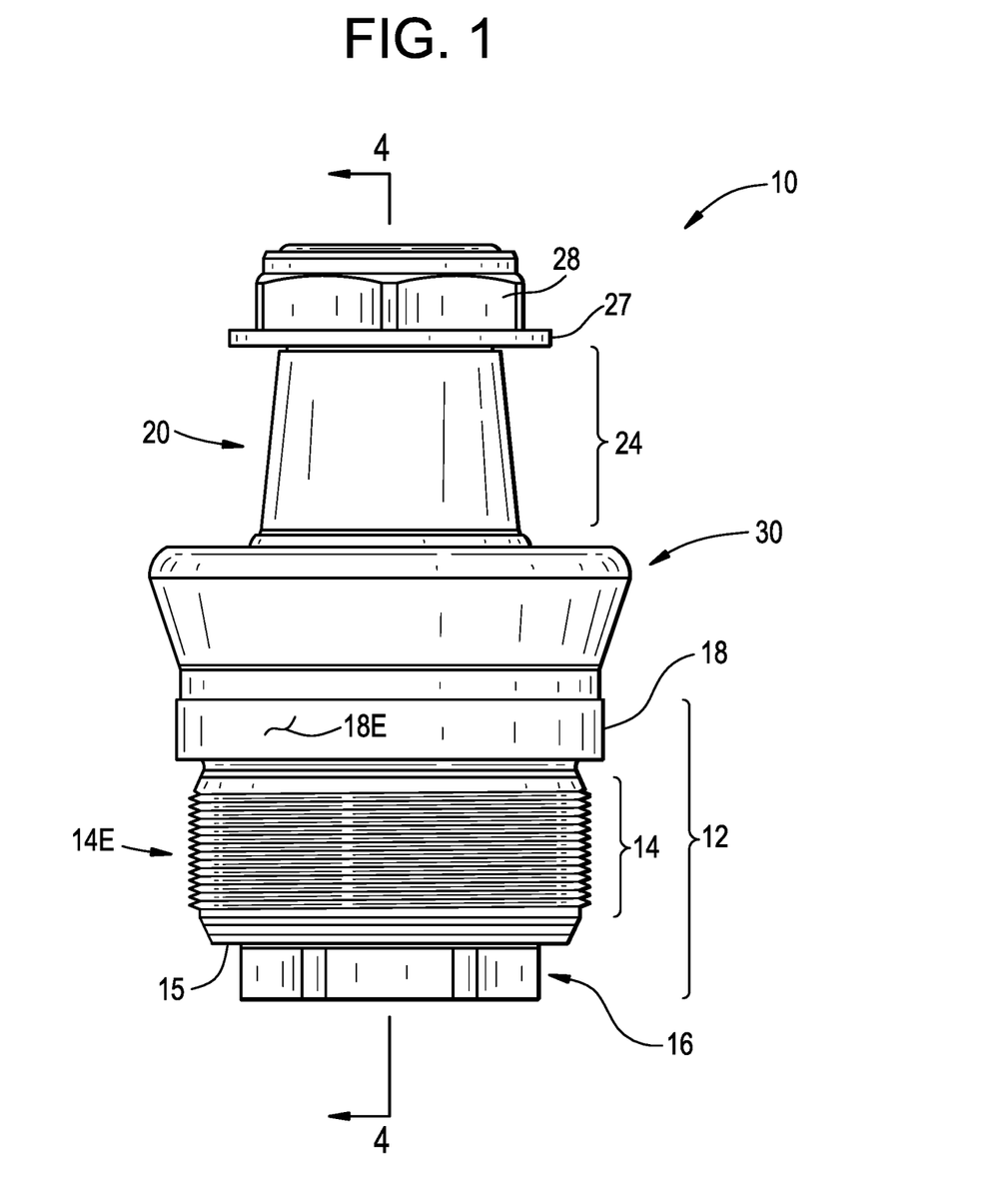
FIG. 1 is a side view of the kingpin assembly of the present invention.
Figure 2:
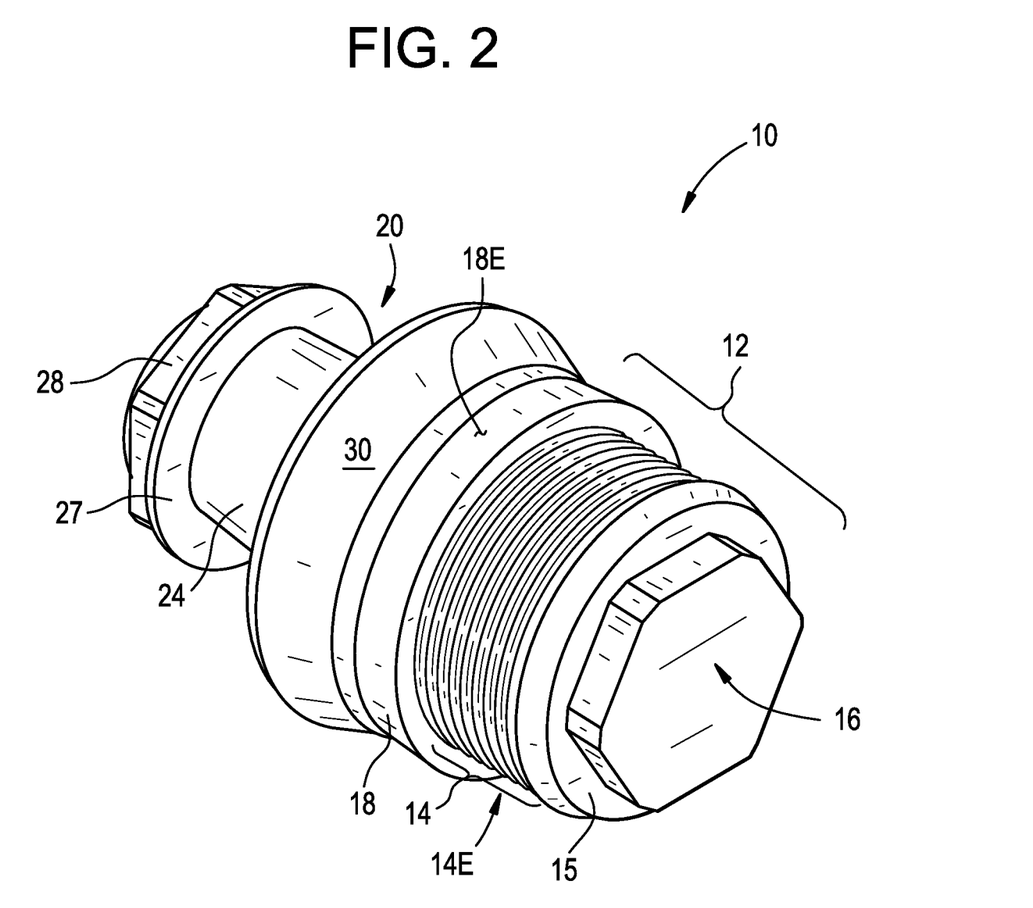
FIG. 2 is a bottom perspective view of the kingpin assembly of FIG. 1.
Figure 3:
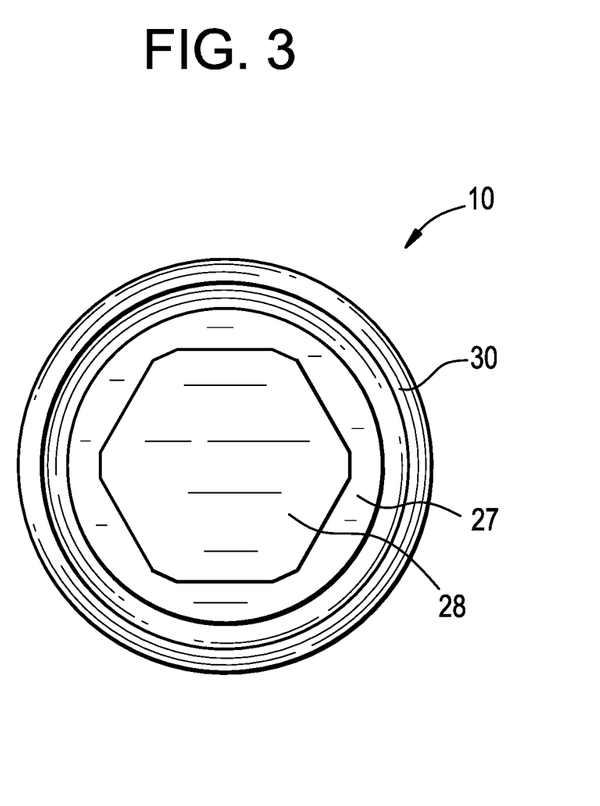
FIG. 3 is top view of the kingpin assembly of FIG. 1.
Figure 4:
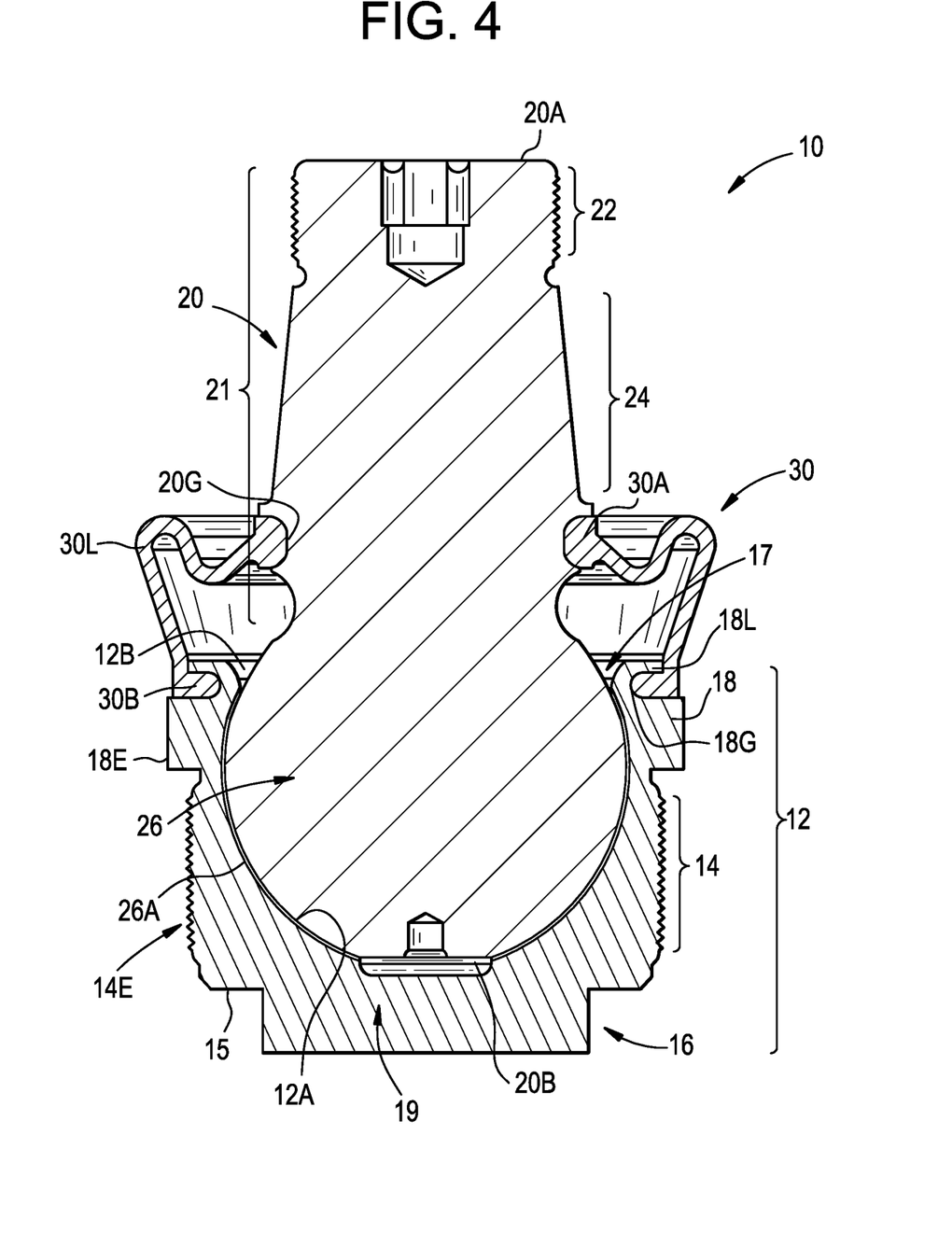
FIG. 4 is a cross sectional view of the kingpin assembly of FIG. 1 taken across section 4-4.

As shown in FIGS. 1-5B, the pin 20 includes a shaft portion 21 that has a locking assembly receiving area 24 for receiving a locking assembly (not shown) such as a connection to a wheel of an automotive vehicle. As shown in FIG. 4, a threaded area 22 extends circumferentially around a portion of the pin 20 between a first end 20A thereof and the locking assembly receiving area 24. As shown in FIGS. 1-3, 5A and 5B, a nut 28 is threaded onto the threaded area 22. The nut is not shown in FIG. 4 for clarity of illustration of the threaded area 22. A flange 27 is formed on an axial surface of the nut 28. The nut 28 axially and radially retains the locking assembly on the locking assembly receiving area 24.

As shown in FIG. 4, the pin 20 has a spherical member 26 (e.g., a ball) extending axially therefrom towards a second end 20B of the pin 20. The spherical member 26 defines a spherical exterior surface 26A. The spherical member 26 is disposed (e.g., swaged into) in the interior area 12B of the base 12 such that the spherical exterior surface 26A. slidingly engages the spherical interior surface 12A of the base 12. A lubricant (e.g., grease) is disposed between the spherical exterior surface 26A and the spherical interior surface 12A to reduce sliding friction therebetween. The spherical member 26 is configured to allow the pin 20 to angularly misalign and rotate relative to the base 12. The shape of the interior surface 12A is configured to axially retain the spherical member 26 in the interior area 12B.

As shown in FIGS. 1-5B, the seal 30 extends between the pin 20 and the base 12. The seal 30 is a continuous annular body formed from an elastomeric material such as a synthetic rubber (e.g., neoprene). The seal 30 includes a first anchor 30A formed on a first axial end thereof and a second anchor 30B formed on a second axial end thereof. A flexible serpentine leg 30L extends between the first anchor 30A and the second anchor 30B. The first anchor 30A is seated (e.g., adhered to, press fit into, or slidingly engaged) in a circumferential groove 20G formed in the pin 20. The groove 20G is located between the spherical member 26 and the locking assembly receiving area 24. The second anchor 30B is seated (e.g., adhered to, press fit into, or slidingly engaged) in the groove 18G formed by the lip 18L. The seal 30 provides a barrier to prevent the entry of debris into the interior area 12B and to contain the lubricant in the interior area 12B.

Although the present invention has been disclosed and described with reference to certain embodiments thereof, it should be noted that other variations and modifications may be made, and it is intended that the following claims cover the variations and modifications within the scope of the invention.

What is claimed is:

1. A kingpin assembly comprising:
   a pin having a shaft portion that has a spherical member extending therefrom;
   a base having a spherical interior surface that defines an interior area that has an opening at an open end of the base, the interior area being bounded by the interior surface that forms a closure across a closed end of the base, the closed end of the base being opposite the open end;
   the spherical member being rotatingly disposed in the interior area with the shaft portion extending outwardly from the open end;
   the closed end having a torque receiving configuration for receiving a torque applying tool thereon; and
   the base having a cylindrical exterior surface that extends continuously around the base, a portion of the cylindrical exterior surface having a threaded area thereon for removably securing the base in a housing;
   wherein the threaded area is axially aligned with a portion of the spherical member.

2. The kingpin assembly of claim 1, wherein the torque receiving configuration is formed integrally with the base.

3. The kingpin assembly of claim 1, the torque receiving configuration extends at least one of:
   away from an axial exterior surface of the closed end;
   into the axial exterior surface of the closed end; and
   radially into the closed end of the base.

4. A linkage assembly comprising:
   a housing having a bore extending therethrough from a first axial end to a second axial end thereof, the bore having an internal threaded area;
   a kingpin assembly comprising:
      a pin having a shall portion that has a spherical member extending therefrom;
      a base having a spherical interior surface that defines an interior area that has an opening at an open end of the base, the interior area being bounded by the interior surface that forms a closure across a closed end of the base, the closed end of the base being opposite the open end;
      the spherical member being rotatingly disposed in the interior area with the shaft portion extending away from the open end; and
   the closed end having a torque receiving configuration;
   the base having a cylindrical exterior surface that extends continuously around the base, a portion of the cylindrical exterior surface having an external threaded area thereon;
      wherein the external threaded area is axially aligned with a portion of the spherical member and threadedly engaged with the internal threaded area;
   the shaft portion extending away from the first axial end of the bore; and
   the torque receiving configuration being proximate the second axial end of the bore for receiving a torque applying tool thereon for torquing the base into the bore of the housing.

5. The linkage assembly of claim 4, wherein the torque receiving configuration extends away from the second axial end of the bore.

6. The linkage assembly of claim 4, wherein the torque receiving configuration is disposed in the bore, proximate the second axial end of the bore.

7. The linkage assembly of claim 4, wherein the torque receiving configuration is formed integrally with the base.

8. The linkage assembly of claim 4, wherein the torque receiving configuration extends at least one of:
   away from an axial exterior surface of the closed end;
   into the axial exterior surface of the closed end; and
   radially into the closed end of the base.

* * * * *